(12) United States Patent
Ahmad et al.

(10) Patent No.: US 8,790,537 B2
(45) Date of Patent: Jul. 29, 2014

(54) PROCESS FOR THE PREPARATION OF SOLID POLYMER ELECTROLYTES USING IONIC LIQUIDS

(75) Inventors: Shahzada Ahmad, New Delhi (IN); Suhasini Avinash Agnihotry, New Delhi (IN); Melepurath Deepa, New Delhi (IN)

(73) Assignee: Council of Scientific & Industrial Research, New Delhi (IN)

( * ) Notice: Subject to any disclaimer, the term of this patent is extended or adjusted under 35 U.S.C. 154(b) by 360 days.

(21) Appl. No.: 12/436,624

(22) Filed: May 6, 2009

(65) Prior Publication Data

US 2010/0084600 A1    Apr. 8, 2010

(30) Foreign Application Priority Data

Jun. 9, 2008   (IN) ............................ 1363/DEL/2008

(51) Int. Cl.
    *H01G 9/02*     (2006.01)
    *G02F 1/153*    (2006.01)
(52) U.S. Cl.
    USPC ...................................... 252/62.2; 548/335.1
(58) Field of Classification Search
    USPC .................... 252/62.2; 548/335.1; 359/270
    See application file for complete search history.

(56) References Cited

U.S. PATENT DOCUMENTS

2007/0007137 A1*  1/2007  Vioux et al. .................. 204/450
2007/0235696 A1* 10/2007  Burrell et al. ................. 252/502

OTHER PUBLICATIONS

Susan et al, "Ion Gel Prepared by in Situ Radical Polymerization of Vinyl Monomers in an Ionic Liquid and Their Characterization as Polymer Electrolytes", J. Am. Chem. Soc., 127, Mar. 2005, pp. 4976-4983.*

Agnihotry et al., "Electrodeposited Prussian blue films: Annealing effect", Electrochimica Acta, 51(20):4291-4301 (2006).

Susan et al., "Ion Gels Prepared by in Situ Radical Polymerization of Vinyl Monomers in an Ionic Liquid and Their Characterization as Polymer Electrolytes", J. Am. Chem. Soc., 127(13):4976-4983 (2005).

* cited by examiner

*Primary Examiner* — Carol M Koslow
(74) *Attorney, Agent, or Firm* — DLA Piper LLP (US)

(57) ABSTRACT

The present invention provides a process for the preparation of solid polymer electrolytes using ionic liquids useful for electrochromic devices or electrochromic windows, which used an insitu polymerized solid polymer electrolyte encompassing an ionic liquid. Therefore the electrolyte is free from leakage, corrosion, side reaction and moisture sensitivity. The synthesis of polymeric electrolyte comprising of Ionic liquid containing at least one of the anions selected from the group of trifluoromethylsulfonate ($CF_3SO_3^-$), bis(trifluoromethylsulfonyl)imide [$(CF_3SO_2)_2N^-$] and bis(perfluoroethylsulfonyl)imide [$(C_2F_5SO_2)_2N^-$], while varying the alkyl chain of the imidazolium ring is described and a simple method for preparing Ionic liquids has also been discussed. A method for preparing substantially pure molten salts i.e. ionic liquids is also described. Another objective of the present invention is to provide an electrochromic device utilizing these systems.

11 Claims, 4 Drawing Sheets

FRONT VIEW

ISOMETRIC VIEW

PROCESS FOR THE PREPARATION OF SOLID POLYMER ELECTROLYTES USING IONIC LIQUIDS

FIELD OF THE INVENTION

The present invention relates to a process for the preparation of solid polymer electrolytes using ionic liquids. More particularly, the present invention relates to a process for the preparation of solid polymer electrolytes using ionic liquids useful for the development of electrochromic devices in general and large area electrochromic windows in particular that employ insitu polymerized electrolytes encompassing ionic liquids as media and nanostructured electrochromic films as electrode.

BACKGROUND OF THE INVENTION

A new type of smart window, with interesting aesthetic and energy saving characteristics, can be achieved by the use of electrochromic (EC) materials. With application of a very low DC bias (1~2 V) the electrochromic device changes its absorption bands and from a transparent state it turns into a colored state. In this state the device absorbs a large amount of the impinging radiant energy and just a very little fraction of radiation is transmitted. The resulting device is almost transparent and can change color by application of a few DC Volts.

Such a window therefore changes from clear to dark, blocks glare, stops solar heat and never obstructs the view. It consists of a series of thin conducting layers that change optical properties persistently and reversibly when an electrical voltage is applied. One layer called Prussian blue acts as a positive electrode and another layer of tungsten oxide acts as a negative electrode and a ion conducting electrolyte separates the two layers. When voltage is applied, cations stored in the positive electrode, traverse to the negative electrode, a process that turns transparent tungsten oxide to tungsten metal bronze (a light absorbing—blue layer) formed by the chemical addition of ions. Simultaneously, the anodic Prussian blue layer undergoes oxidation and acquires a deep blue color, which is complementary to the color change experienced by the cathodic tungsten oxide film. The longer the duration, for which the voltage is applied, more ions are transferred and the window becomes darker. It is important to recall that EC films can block out the visible as well as the infrared part of the solar spectrum and can therefore reduce costs associated with heating, lighting and cooling.

Once the applied voltage is reversed, the process is also reversed, these windows use energy only to change their optical state and no continuous power is required to maintain any desired particular optical state. If the voltage is turned off while switching, the glass retains the color attained. This is attributed to the battery-like behavior of the EC device. Energy consumption for one full coloring cycle, or for minimum to maximum bleaching, is approximately 200 W/m$^2$.

The response times vary from a few seconds to a few minutes depending upon the size of the window. The technology can save substantial amounts of energy in buildings/automobiles and dynamic electrochromic glazings may eventually replace traditional solar static control technologies such as tints, reflective coatings and shading devices.

Although research in this area dates back to the 1960s, no reliable large-area electrochromic (EC) product for smart window applications has been brought to market. This is mainly due to issues involving cost, performance, and the stability of prospective devices and production methods.

In prior art, attempts relating to reversible mirror devices that employ conventional organic solvents have been described in, for example, U.S. Pat. No. 5,923,456 to D. M. Tench et al. entitled "Reversible Electrochemical Mirror," issued on Jul. 13, 1999; U.S. Pat. No. 6,111,685 to D. M. Tench et al. entitled "Reversible Electrochemical Mirror (REM) With Improved Electrolyte Solution," issued on Aug. 29, 2000; U.S. Pat. No. 6,166,847 to D. M. Tench et al. entitled "Reversible Electrochemical Mirror for Modulation of Reflected Radiation," issued on Dec. 26, 2000; and U.S. Pat. No. 6,400,491 to D. M. Tench et al. entitled "Fast-Switching Reversible Electrochemical Mirror (REM)," issued on Jun. 4, 2002, all incorporated by reference herein. Organic solvents, however, present their own set of problems for reversible mirrors. These problems may include low solubility of charge carriers in organic solvents, poor conductivity and poor solubility of metal ions, low boiling points, toxicity, flammability, low electrochemical stability, low photostability, and poor seal tolerance. Some organic solvents are reduced (and generate hydrogen gas) more easily than the metal ions are electrodeposited. Additionally, organic solvents that are polar enough to support electrochemistry may include functional groups such as ketone and ester groups that may chemically react with metals and interfere with electrodeposition. Another reversible mirror employs a permanent thin metal film that becomes transparent upon exposure to hydrogen gas (see, for example, U.S. Pat. No. 6,535,323 to M. T. Johnson et al. entitled "Light-switching device," issued on Mar. 18, 2003; U.S. Pat. No. 5,905,590 to P. Van Der Sluis et al. entitled "Optical switching device comprising switchable hydrides," issued on May 18, 1999; U.S. Patent Application 20020044717 to T. J. Richardson entitled "Electrochromic materials, devices and process of making," which was published Apr. 18, 2002; and T. J. Richardson et al., "Switchable mirrors based on nickel-magnesium films," Applied Physics Letters, 2001, 78, 3047-3049, all incorporated by reference herein). These devices operate either by addition and removal of hydrogen gas, which requires gas handling capabilities and the manipulation of highly flammable hydrogen gas, or by electrochemical production of hydrogen gas from highly caustic aqueous solutions The use of polymer electrolytes formed by organic solvent doped with various lithium salts is restricted in electrochromic devices especially in large area devices due to number of disadvantages associated with them such as poor thermal and low electrochemical stability and hydrophilicity.

This invention relates to the employment of ionic compounds and methods for their preparation. In particular the invention relates to ionic compounds which are liquid at relatively low temperatures, i.e. generally below about 100° C., and preferably below about 60° C. and more preferably which are liquid at or near to room temperature. There is much current interest in the field of ionic liquids. Such systems, which are examples of molten salts, have a number of interesting and useful chemical properties, and have utility, for example, as highly polar solvents for use in preparative chemistry, and as catalysts. They also have particular applications in electrochemistry, for example in batteries, fuel cells, photovoltaic devices and electrodeposition processes, for example in baths for the electroplating of metals. Ionic liquids have very low vapor pressure and thus, in contrast to many conventional solvents, are very advantageous as they produce virtually no hazardous vapors. They are therefore advantageous from a health, safety and environmental point of view.

Ionic liquids, which are designer solvents and called neoteric solvents, have shown that the problems associated with conventional organic solvents, can be overcome by their use. Ionic liquids are typically organic solvents and are composed of ammonium cations and trifluoromethylsulfonyl based anions.

In another embodiment of the present invention the electrolytes may also contain one or more stiffening agents to increase the viscosity of solution while maintaining conductivity. Stiffening agents include, but are not limited to organic monomers such as acrylonitrile, vinlidene fluoride hexafluoropropylene, vinyl alcohol, vinylacetate, methylmethacrylate and their comonomers. These polymers may be formed by in situ polymerization of monomers (for example, U.S. Pat. No. 6,420,036 to D. V. Varaprasad et al. entitled Electrochromic Polymeric Solid Films, Manufacturing Electrochromic Devices Using Such Solid Films, and Processes for Making Such Solid Films and Devices," incorporated by reference herein).

Meanwhile U.S. Pat. No. 0,257,633 A1 (Agrawal et al) discloses an ionic liquid based device which is free from one or more of the drawbacks such as moisture sensitivity, high volatility, hydrophilicity, low electrochemical and chemical stability and susceptibility to ultraviolet degradation. This patent though descriptive and describes the use of ionic liquids in electrochromic devices, but fails to describe the method for the synthesis of ionic liquids.

Susan et al. (J. Am. Chem. Soc., 127, 2005, 4976 and references there in) discloses a method for the preparation of ionic liquid based on ammonium cations with varying alkyl groups based on Bronsted acid-base combination for use as electrolytes in fuel cells. They also discussed the polymerization of a common monomer in these ionic liquids. Because these electrolytes were made for an application where transparency is not a prerequisite, thereby preventing its use as an electrolytes in electrochromic transmissive devices. Another additional disadvantage is that the electrolyte has some flow property, which acts to reduce the cycle life of the electrochemical cell formed thereof.

This invention embodies large area smart windows as large areas are necessary for sunlight intensity reduction and heat flux control in buildings; the construction of large-scale panels should be achievable in a relatively short time. The new EC windows or devices thus proposed based on an innovative solution, allow the formation of the solid electrolytes, largely based on ionic liquids in a polymer matrix, here after called as ionogels that can be easily produced and sandwiched between two electrodes which is attributable to their good adhesive properties and compatibility with the electrodes.

OBJECTS OF THE INVENTION

The main object of the present invention is to provide a process for the preparation of solid polymer electrolytes using ionic liquids useful for making device encompassing the electrochromic material in nanostructured phase and a solid polymer electrolyte with liquid like conductivity attributes in very fast switching between colored and bleached states.

Another object of the present invention is to provide a process for the synthesis of highly cross linked ionogels, which do not contain any organic solvent that cause leakage of electrolytes and other side reactions without compromising on conductivity, high chemical, thermal and electrochemical stability and hydrophobicity.

Yet another object of the present invention is to provide the synthesis of highly conducting ionic liquid with ionic conductivity between $10^{-3}$ to $10^{-2}$ S/cm, along with a wide electrochemical stability in some cases ±3 Volt.

Yet another object of the present invention is to provide a simple and a cost effective method for the preparation of ionic liquids and its precursor materials. The invention also includes a method for removal of colored impurities from ionic liquids.

Yet another object of the present invention is to provide a relatively inexpensive and durable method for the fabrication of large area electrochromic devices.

et another object of the present invention is to provide a simple and a scalable method for the fabrication of devices.

Still another object of the present invention is to provide a low cost highly ionic conductive electrolyte which is highly cross linked.

BRIEF DESCRIPTION OF THE DRAWINGS

FIG. 1 represents the embodiments of the present invention and together with the description in text, serves to explain the principles of the invention. In the drawings, FIG. 1 (A) illustrates the cut away front view of the invented electrochromic device. Where 1T and 1B represent the top and bottom electrical connection terminal respectively, and 2T and 2B represent the top and bottom electrically conducting coating glasses. In the FIG. 1(A) 3T and 3B represent the top and bottom electrochromic coating materials, while 4 represents a layer of solid polymer electrolyte, and 5 is an electric wire. FIG. 1 (B) represents the isometric view of the discussed electrochromic device to understand its basic structure.

SUMMARY OF THE INVENTION

Accordingly the present invention provides a process for the preparation of solid electrolytes using ionic liquids and the said process comprising the steps of:
(a) preparing 1-ethyl, 3-methyl imidazolium bromide (EMIBr) by reacting 1-methylimidazole with ethyl bromide in cyclohexane, under reflux for a period of 8-12 hrs, followed by recrystallization using a mixture of ethyl acetate and isopropyl alcohol under rotary evaporation, at a temperature of 60-70° C. for a period of 0.5 hour,
(b) decolorizing the above said compound of EMIBr by adding activated charcoal and boiling the solution mixture, at a temperature of 70-80° C. for a period of 2-10 minutes and subjecting the resultant decolorize compound to ion exchange reaction by using lithium salt of Lithium bis (trifluoromethane sulfonyl)imide [LiTFSI] or lithium bis (perfluoromethane sulfonyl) imide [LiBETI] in deionized water, at a temperature of 60-70° C., for a period of 7-8 hrs and separating the bottom layer by known method followed by washing with water and dehydrated under vacuum and filtration by known method to obtain the desired hydrophobic ionic liquid, (c) optionally pre-polymerizing the vinyl monomer to obtain oligomers followed by in situ polymerization of the above said oligomer or monomer obtained in step (b) either alone or with propylene carbonate taken in a ratio of 9:1 to 8:2 in ionic liquid, in the presence of an initiator in the range of 0.5-1.0 W % of monomer or oligomer and cross linker in the range of 1-2 W % of monomer used, at a temperature of 60-70° C. for 20-40 minutes to obtain the desired polymer electrolyte. In an embodiment of the present invention the vinyl monomer used is in the range of 20-25% by volume.

In yet another embodiment of the present invention the vinyl monomer used is methylmethacrylate (MMA).

In yet another embodiment of the present invention the initiator used in step (c) is selected from the group consisting of peroxides, hydroperoxides, AIBN (azobis iso-butyronitrile) and benzoyl peroxide.

In yet another embodiment of the present invention the cross linker used in step (c) is acryl amide.

In yet another embodiment of the present invention the conductivity of ionic liquid obtained is in the range of $10^{-3}$ to $10^{-2}$ S/cm.

In yet another embodiment of the present invention the electrochemical stability of ionic liquid obtained in step (b) is in the range of $-3$ to $+3$ Volt.

In yet another embodiment of the present invention the polymer electrolyte obtained is in the form of transparent, highly ion conducting and thermally stable sold product.

In yet another embodiment of the present invention the polymer electrolytes obtained is useful for preparing electrochromic devices.

DETAIL DESCRIPTION OF THE INVENTION

The present invention provides a process for the preparation of solid polymer electrolytes using ionic liquids useful for electrochromic devices or electrochromic windows, which used an insitu polymerized solid polymer electrolyte encompassing an ionic liquid. Therefore the electrolyte is free from leakage, corrosion, side reaction and moisture sensitivity.

An electrochromic devices/windows fabricated by using the electrolyte "ionogels" that exhibit a dark blue color and shows a transmission of 15%, and in the bleached state it was transparent with a transmittance of 80% and showed an excellent open circuit memory effect without any deterioration in the optical transmittance.

The polymerizing solution mixture may contain some solid salts preferably consisting of a lithium cation and the associated anion must possess the same ionic liquid anion, as this will not hinder its solubility. These solid salts will further provide ions for intercalation, change in ionic conductivity and depress the freezing point besides facilitating the polymerization process. The suggested concentration is below 0.5 M of the solution mixture and most preferably 0.1 M.

In a further embodiment of this invention, monomers i.e. the polymerizable materials can be mixed with the ionic liquid solution along with the initiator to obtain solid polymer electrolytes. The monomer can be selectively selected from urethane, acrylate, styrene, vinyl chloride, vinyl esters and vinyl monomers. The more preferred ones are vinyl monomers as they are the most transparent monomers and can be polymerized easily. The compatibility of a large number of vinyl monomers in ionic liquids make them preferred candidates to carry out polymerization to yield transparent, mechanically stable and highly conductive polymer electrolytes. Methyl methacrylate is most preferable due to its highest transparency and UV resistance. For optimum movement of ions, the concentration of monomers should not exceed 25% of the solvent. The monomer can be polymerized easily with one who is skilled in the art via thermal, photo-polymerization, UV-polymerization but preferably by thermal polymerization method. The common thermal initiators that may be used are peroxides, hydroperoxides, AIBN (azobis (isobutyronitrile)). The most preferable is benzoyl peroxide as it decomposes easily to produce free radical above 60° C. and then attacks the double bond of the monomer via free radical polymerization of the monomer to form the polymer electrolyte.

In a still another embodiment of the invention, to further ease the polymerization process the above mentioned initiators can be recrystalised twice in alcohol to remove any impurities. The concentration of the initiator can be optimized to control the molecular weight of the polymer. The initiator concentration can be kept below 2 wt. % of the monomer more preferable at 1 wt. % of the monomer. The lower the initiator concentration, the higher will be the molecular weight of the polymer formed.

In another embodiment of this invention, to minimize the shrinkage in the insitu polymerization process, the monomer can be pre-polymerized i.e. converted into an oligomer first and then dissolved in the solution mixture, which will be further set for polymerization.

Electrochromic devices/windows typically consist of first conductive layer generally indium doped tin oxide, or fluorine-doped indium tin oxide second layer of an electrochromic material in our case tungsten trioxide ($WO_3$). Electrochromic material either consisting of organic or inorganic can be used with the present invented electrolyte but are not limited to metal oxides such as $WO_3$, $MoO_3$, $NiO$, $V_2O_5$, $TiO_2$ while conducting polymer such as polyaniline (PANI), polypyrrole (PPy), polycarbazole, polyethylenedioxythiophene (PEDOT) etc.

In yet another embodiment of the invention, the electrolyte was filled using the most convenient and economical manufacturing technique, i.e. by injection filling technique, where in the electrolyte was forced into the cavity through the port under pressure with the help of a syringe and was then set for insitu polymerization. For this type of filing technique, the empty cell preferably includes more than one port, one for filling and another for venting gas as the cell is filled.

In another embodiment of the invention, the molten salt solution further comprises of at least one soluble, aprotic organic co-solvents such as propylene carbonate, N-methyl pyrrolidinone, perfluorodecalin, and perfluorodecane having a boiling point greater than 150° C., low melting points (i.e. below $-30°$ C.), and concentrations of about 0.5% to 30%. The co-solvent decreases the viscosity of solution and does not interfere with the durability and function of the devices.

In an embodiment of the invention, the electrolyte of the device comprises of at least one thixotropic agent, preferably fumed silica in the range of 1-5%.

In another embodiment of the invention, the bulk solution that forms the electrolyte contains an ionic liquid. The ionic liquids, where quaternary ammonium cations are selected from the group consisting of pyridinium, pyridazinium, pyrimidinium, pyrazinium, imidazolium, pyrazolium, thiazolium, oxazolium, triazolium, tetraalkylammonium, and N-methyl morpholinium cations. The cation of the ionic liquid is preferably a tetra alkyl ammonium, alkyl-substituted pyrrolidine, or more preferably an alkyl-substituted imidazolium ion. The anion of the molten salt is preferably perchlorate ($ClO_4^-$), tetrafluoroborate ($BF_4^-$), hexafluorophosphate ($PF_6^-$) and trifluoromethylsulfonate ($CF_3SO_3^-$), bis(trifluoromethylsulfonyl)imide [$(CF_3SO_2)_2N^-$], and bis(perfluoroethylsulfonyl)imide [$(CF_3CF_2SO_2)_2N^-$]

In a still another embodiment of the invention, the device comprises indium tin oxide electrodes or doped tin oxide electrodes.

In an embodiment of this invention, the electrochromic device encompassing tungsten oxide on the negative terminal and Prussian blue on the positive terminal gives blue color and by changing polarity, the device bleaches (becomes transparent).

The following examples illustrate the preparation of ionogels as well as fabrication of large area electrochromic devices of the present invention and therefore should not be construed to limit the scope of the present invention.

EXAMPLE-1

Preparation of Ionic Liquid

1-Ethyl, 3-Methyl imidazolium bis(trifluoromethene sulfonyl) imide, [EMITFSI] or 1-Ethyl,3-Methyl imidazolium bis(perfluoroethyl sulfonyl) imide [EMIPFSI] was prepared as follows. 1-Ethyl, 3-methyl imidazolium bromide [EMIBr] was first prepared by taking 1-Methylimidazole (37 gm, 0.45 mole) in 200 ml cyclohexane, which was placed in a round bottomed flask fitted with a reflux condenser on a magnetic stirrer. Ethyl bromide (147 gm, 1.30 mole) was added drop wise over a period of 1 hr to the reaction medium and the reaction was refluxed at 80° C. for 12 hrs. After the completion of the reaction, the product was recrystallized twice using a 1:1 mixture (v/v) of ethyl acetate and isopropyl alcohol on a rotary evaporator for 1 hr at 70° C. under a pressure of 0.1 mbar.

Finally the anion exchange reaction was carried out from Br- to bis (trifluoromethane sulfonyl) imide by heating the equimolar mixture of EMIBr and Lithium bis (trifluoromethane sulfonyl) imide [LiTFSI] or [LiBETI]. EMIBr (20.54 gm) was dissolved in 50 ml of deionized water and then activated charcoal (2 gm) was added to it. Finally the resulting solution was boiled at 80° C. for 5 minutes and then filtered off. The filtrate was then mixed with a freshly prepared aqueous solution of LiTFSI (30.85 gm) in 500 ml of deionized water and stirred at 70° C. for 8 hrs. This result in formation of two layers, the bottom layer containing EMITFSI was separated away with the help of separating funnel and washed twice with deionized water (2×50 ml) and then dehydrated under vacuum at 120° C. for 24 hrs and finally filtered through activated alumina to give anhydrous, highly pure, colorless liquid of EMITFSI.

EXAMPLE-2

Preparation of 1-Butyl-3-methylimidazolium bis (trifluoromethene sulfonyl) imide 1-Butyl-3-methylimidazolium Bromide [BeMeIm$^+$Br$^-$] was first prepared using the aforementioned assembly and procedure, except to (22.22 gm, 0.283 mole) 1-Methylimidazole of 39 gm of ethyl bromide was added drop wise. Finally the anion exchange was carried out by using eqimolar solution of BeMeIm$^+$Br$^-$ with LiTFSI using the same procedure as discussed above.

EXAMPLE-3

Preparation of Ionogels

Methylmethacrylate (MMA) monomer in ionic liquid: EMITFSI or BMITFSI/EMIBETI based ionic liquid used as a polymerization solvent. Prior to polymerization, the monomer was made inhibitor free by passing through activated alumina column. The MMA monomer was taken as 25% by volume of the polymerizing solvent and benzoyl peroxide (1% based on MMA) was used as an initiator. The monomer was then mixed with the ionic liquid and set for polymerization. The electrolyte was filled using the most convenient and economical manufacturing technique, i.e. by injection filling technique, where the electrolyte was forced into the cavity through the port under pressure with the help of a syringe and was then set for insitu polymerization at 70° C. for 12 hrs. For this type of filling technique, the empty cell preferably includes more than one port, one for filling and another for venting gas as the cell is filled.

EXAMPLE-4

Preparation of Ionogels

Example 3 can be repeated with one or more miscible solvents that can reduce the viscosity and price without altering the durability and kinetics of the electrochromic devices. Additionally they will provide change in ionic conductivity, solubility for some other ingredients and ease of processing. It is advisable to keep the concentration below 50%, preferable to 30% and more appropriately to 20%. Preferred co-solvents are aprotic based i.e. propylene carbonate, ethylene carbonate, γ-butyro lactone, and most preferably sulfolane. EMITFSI and PC mixture was taken in a ratio of 80:20 (v/v) respectively as a polymerization solvent. Prior to polymerization the monomer was made inhibitor free by passing it through an activated alumina column. The MMA monomer was taken as 25% by volume of the polymerizing solvent and benzoyl peroxide (1 wt. % w.r.t. MMA) was used as an initiator and 2 wt. % of acryl amide (w.r.t. MMA weight was used as a cross linker. The monomer was pre-polymerized at 70° C. for 30 minutes and then it was mixed with the IL based solvent. The electrolyte was filled using the most convenient and economical manufacturing technique, i.e. by injection filling technique, where the electrolyte was forced into the cavity through the port under pressure with the help of a syringe and was then set for insitu polymerization at 70° C. for 24 hrs. For this type of filling technique, the empty cell preferably includes more than one port, one for filling and another for venting gas as the cell is filled.

EXAMPLE 5

EMITFSI and PC mixture was taken in a ratio of 80:20 (v/v) respectively as a polymerization solvent. 0.1 M LiTFSI was further added to the solution mixture to result in faster kinetics of the devices. The monomer was pre-polymerized at 70° C. for 30 minutes and then it was mixed with the IL based solvent. Prior to polymerization the monomer was made inhibitor free by passing it through an activated alumina column. The MMA monomer was taken as 25% by volume of the polymerizing solvent and benzoyl peroxide (1% w.r.t. MMA) was used as an initiator and 2 wt. % of acryl amide (w.r.t. MMA) was used as a cross linker.

EXAMPLE 6

Tungsten metal powder (13 gms) was first dissolved in 80 ml of hydrogen peroxide (30%) at 40-55° C., preferable at 50° C., which is then filtered to yield a colorless clear solution and then 80 ml of glacial acetic acid was added to the solution and this solution was refluxed at a temperature between 50-60° C. more preferably at 55° C. for decomposition of excess peroxide and acetylation of peroxotungstic acid, for eight to twelve hours, preferably for ten hours, to yield a pale yellow turbid solution. The solution was vacuum dried at a temperature between 50-60° C., preferably at 55° C., to remove excess acetic acid and hydrogen peroxide and a yellow product of acetylated peroxotungstic acid was formed. Dissolution of 30 gms of this product in 90 ml of absolute ethanol yielded a clear precursor solution which was used for dip coating on $SnO_2$:F coated glass. The deposition of films over $SnO_2$:F coated glass substrates with an active area of 1 30×30 $cm^2$ dimensions was carried out by using 2000 ml of this precursor solution of exactly the same chemical composition. The withdrawal speed could be between 25-35 cm $min^{-1}$, preferably 30 cm $min^{-1}$. The films were withdrawn in a humid atmosphere by blowing moist air over the substrate at 25-30° C., preferably 28° C., with relative humidity between 50-80%, preferably 75%. The films were heated to 100° C. at a rate of 3-10° C. $min^{-1}$ (preferably at 3° C. $min^{-1}$) and maintained at this temperature for one hour and then cooled back to room temperature. The films were then heated to 250° C. at a rate of 5-10° C. $min^{-1}$ (preferably at 5° C. $min^{-1}$) and maintained at this temperature for one hour and then cooled back to room temperature. The films were preserved in air at temperatures between 25-30° C., without any loss in structural integrity or optical activity for one year. The solution was stable—did not particulate or gel for three months when maintained at temperatures between 0-5° C.

EXAMPLE 7

Tungsten metal powder (13 gms) was first dissolved in 80 ml of hydrogen peroxide (30%) preferable at 50° C., which was then filtered to yield a colorless clear solution. 80 ml of glacial acetic acid was added to the solution and this solution was refluxed at a temperature more preferably at 55° C., to decompose excess of peroxide and acetylation of peroxotungstic acid, for eight to twelve hours, preferably for ten hours, to result a pale yellow turbid solution. The solution was vacuum dried at a temperature between 50-60° C., preferably at 55° C., to remove excess acetic acid and hydrogen peroxide and a yellow product of acetylated peroxotungstic acid was formed. Dissolution of 30 g of this product in 90 ml of absolute ethanol yielded a clear solution, to which 1-6 wt % (preferably 4 wt. %) of oxalic acid dihydrate or glycerol or citric acid or ethylene glycol (most preferred is oxalic acid dihydrate) was added and dissolved. The resulting clear yellow solution was used for deposition of tungsten oxide on $SnO_2$:F coated glass by dip coating technique. The deposition of films over $SnO_2$:F coated glass substrates of 30□30 $cm^2$ dimensions was carried out by using 2000 ml of this precursor solution of exactly the same chemical composition. The withdrawal speed could be between 25-35 cm $min^{-1}$, preferably 30 cm $min^{-1}$. The films were withdrawn in a humid atmosphere by blowing moist air over the substrate at 25-30° C., preferably 28° C., with relative humidity between 50-80%, preferably 75%. The films were heated to 100° C. at a rate of 3-10° C. $min^{-1}$ (preferably at 3° C. $min^{-1}$) and maintained at this temperature for one hour and then cooled back to room temperature. The films were then heated to 250° C. at a rate of 5-10° C. $min^{-1}$ (preferably at 5° C. $min^{-1}$) and maintained at this temperature for one hour and then cooled back to room temperature. The films were preserved in air at temperatures between 25-30° C., without any loss in structural integrity or optical activity for one year. The dipping solution was stable—did not particulate or gel for six months when maintained at temperatures between 0-5° C.

EXAMPLE 8

Dissolution of tungsten metal powder (13 gms) in 80 ml of 30% hydrogen peroxide at 40-55° C., preferable at 50° C., yielded a solution, which was filtered to yield a colorless clear solution. 80 ml of glacial acetic acid was added to the solution and this solution was refluxed at a temperature between 50-60° C., preferably at 55° C., for decomposition of excess peroxide and acetylation of peroxotungstic acid for eight to twelve hours, preferably for ten hours, to yield a pale yellow turbid solution. The solution was vacuum dried at a temperature between 50-60° C., preferably at 55° C., to remove excess acetic acid and hydrogen peroxide and a yellow product of acetylated peroxotungstic acid was formed. Dissolution of 30 g of this product in 90 ml of a mixture of absolute ethanol and Polyethylene glycol 400 mixed in a 3:1 volume ratio yielded a clear solution. The resulting clear yellow solution was used for deposition of tungsten oxide on $SnO_2$:F coated glass by dip coating technique. The deposition of films over $SnO_2$:F coated glass substrates of 30×30 cm2 dimensions was carried out by using 2000 ml of this precursor solution of exactly the same chemical composition. The withdrawal speed could be between 25-35 cm $min^{-1}$, preferably 30 cm $min^{-1}$. The films were withdrawn in a humid atmosphere by blowing moist air over the substrate at 25-30° C., preferably 28° C., with relative humidity between 50-80%, preferably 75%. The films were heated to 100° C. at a rate of 3-10° C. $min^{-1}$ (preferably at 3° C. $min^{-1}$) and maintained at this temperature for one hour and then cooled back to room temperature. The films were then heated to 250° C. at a rate of 5-10° C. $min^{-1}$ (preferably at 5° C. $min^{-1}$) and maintained at this temperature for one hour and then cooled back to room temperature. The films were preserved in air at temperatures between 25-30° C., without any loss in structural integrity or optical activity for one year. The dipping solution was stable—did not particulate or gel for six months when maintained at temperatures between 0-5° C.

EXAMPLE 9

Agnihotry et al (Electrochimica Acta 51, 2006, 4291) describe the preparation of Prussian Blue films by an aqueous solution of 0.01 M of $K_4$ (Fe(CN)$_6$ and 0.01 M $FeCl_3$ (anhydrous) in 0.01 N HCl was thus used for galvanostatic cathodic electrodeposition of Prussian blue films. A current density of 5-20 µA $cm^{-2}$ (preferably 10 µA $cm^{-2}$) was applied for 8-30 min (preferable for 15 min), with $SnO_2$:F coated glass substrates as the working and counter electrodes. The cathode and anode were each of 45 inch×30 inch dimensions. The films thus formed were rinsed in double distilled water and dried in air at room temperature (25-30° C., RH ~60-70%), preferably at 28° C. at 65%. The films possessed a shelf life time of three months when preserved in air at room temperature at temperatures between 25-30° C.

EXAMPLE 10

Example 9 can be repeated with an aqueous solution of 0.01 M of $K_4$ (Fe (CN)$_6$, 0.01 M $FeCl_3$ (anhydrous) and 0.2 M KCl in 0.01 N HCl which was used for galvanostatic cathodic electrodeposition. A current density of 5-20 µA $cm^{-2}$ (preferably 10 µA $cm^{-2}$) was applied for 8-30 min (preferably for 15 min), with $SnO_2$:F coated glass substrates as the working and counter electrodes. The cathode and anode were each of 45 inch×30 inch dimensions. The blue films thus formed were rinsed in double distilled water and dried in air at room temperature (25-30° C., RH~50-70%), preferably at 28° C. at 50%. The films possessed a shelf life time of three months when preserved in air at ambient temperature i.e. between 25-30° C.

EXAMPLE 11

Figure 1:
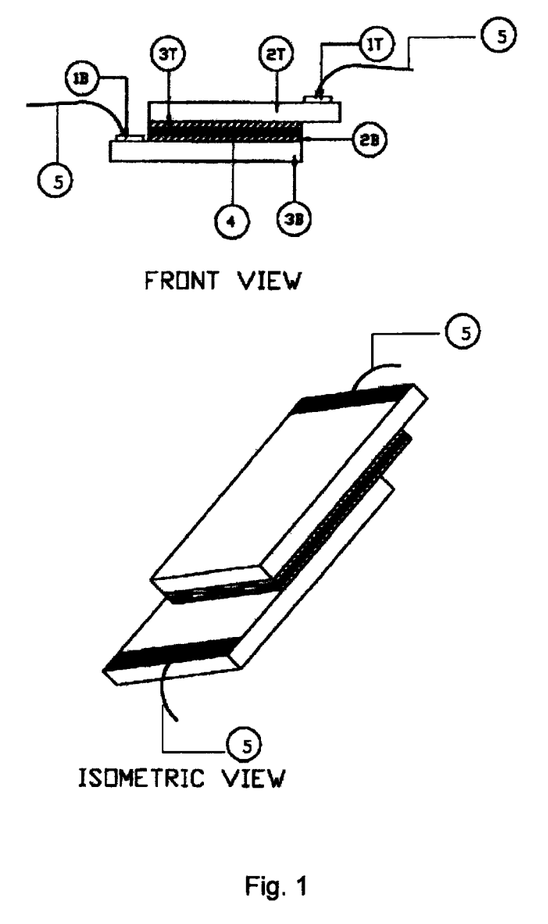
Figure 2:
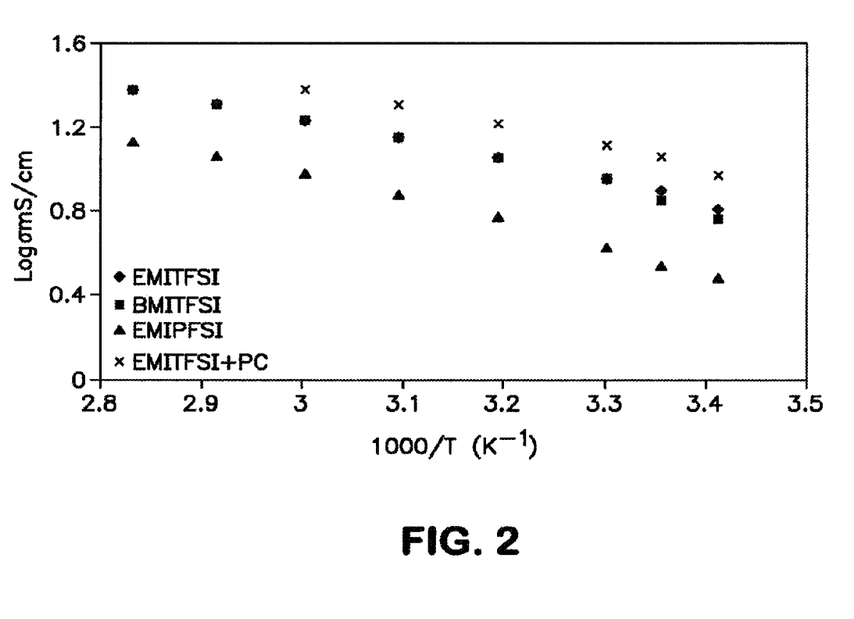
FIG. 2 represents conductivity verses temperature of ionic liquids.
Figure 3:
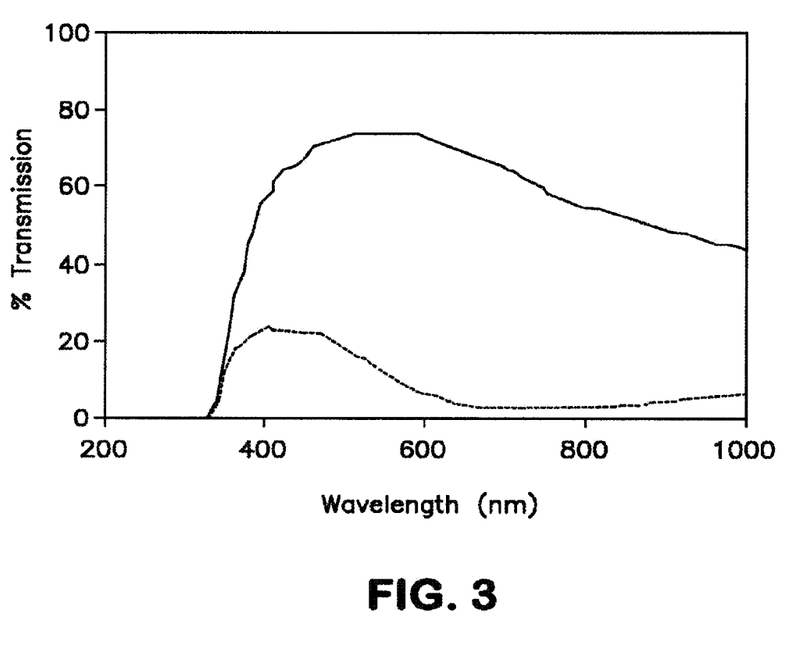
FIG. 3 represents transmission spectra of an electrochromic device that embodies tungsten oxide layer on one electrode and Prussian blue on another electrode in colored and bleached states.
Figure 4:
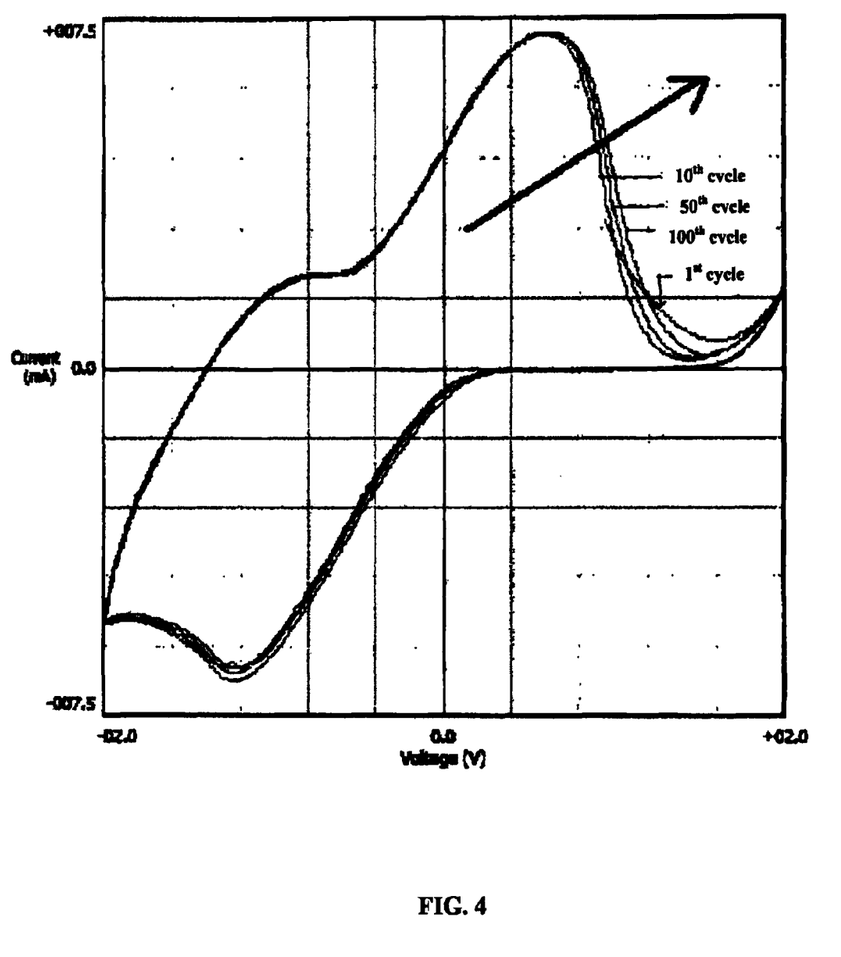
FIG. 4 represents a cyclic voltammogram of the device configure with the help of tungsten oxide and Prussian blue electrodes, the arrow indicates the increase in the cycle number of the device and denotes the $1^{st}$, $10^{th}$, $50^{th}$ and $100^{th}$ cycle respectively.

Transparent substrate was cut into two rectangular pieces of same dimensions. The substrate was then cleaned, washed and dried under laboratory conditions. Tungsten oxide and Prussian blue coatings were then performed as described in the above Examples. A 3M glass adhesive tape which also acts as a spacer was put on the all the four edges of the glass on one electrode and the second substrate was then placed on top of it make it hermetically sealed, with two openings at the upper side of the glass on the ends. The outer edges of the glass were then sealed with the help of an epoxy. The exposed edge of the transparent electrode of both the substrates was then covered with busbar or with a smooth silver lining to make electrical connections. The cavity was then injected with the electrolyte solution and then set for polymerization. After the cavity was filled, the two holes were plugged with Teflon balls and further sealed with the epoxy. Electrical connection was then made with both the terminals and the device colored uniformly to a deep blue color and bleached by reversing the polarity. Transmission spectra were recorded by placing the device in spectrophotometer. FIG. 3 shows the spectra in the colored and the bleached state.

The Main Advantages of this Method are:

1. A relatively low-cost process that can be used to manufacture a device that provides both high switching range and long-term stability. It is based on the use of two complementary inorganic EC layers Prussian blue and tungsten oxide prepared by electrodeposition and dip coating respectively, together with the use of an ion-conducting polymer electrolyte interlayer. Inorganic EC materials are inherently more stable than organic ones. The use of two complementary layers instead of combining one layer with the so called ion-storage film makes it possible to switch between higher-maximum and lower-minimum transmittance with enhanced coloration efficiency.

2. The invention describes a simple, most practical and scalable method for fabricating electrochromic devices for large area window applications.

We claim:

1. A process for the preparation of polymer electrolytes using ionic liquids comprising the steps of:
   (a) preparing 1-ethyl, 3-methyl imidazolium bromide (EMIBr) by reacting 1-methylimidazole with ethyl bromide in cyclohexane, under reflux for a period of 8-12 hrs, followed by recrystallization using a mixture of ethyl acetate and isopropyl alcohol under rotatory evaporation, at a temperature of 60-70° C. for a period of 0.5 hour,
   (b) decolorizing the above said compound of EMIBr by adding activated charcoal and boiling the solution mixture, at a temperature of 70-80° C. for a period of 2-10 minutes and subjecting the resultant decolorize compound to ion exchange reaction by using lithium salt of Lithium bis (trifluoromethene sulfonyl) imide [LiTFSI] or lithium bis (perfluoromethene sulfonyl) imide [Li-BETI] in deionized water, at a temperature of 60-70° C., for a period of 7-8 hours and separating the bottom layer by known method followed by washing with water and dehydrated under vacuum and filtration by known method to obtain the desired hydrophobic ionic liquid,
   (c) mixing a polymerizable material with the ionic liquid solution and subjecting the obtained mixture to in situ polymerization in the presence of one or more additives forming a polymerizing solvent to obtain the polymer electrolyte, wherein the additive is an initiator optionally in combination with one or more additives selected from the group consisting of cross linkers, aprotic organic solvent, and a stiffening agent, wherein the cross linker is acrylamide, and further wherein the polymerizable material is a vinyl monomer.

2. The process of claim 1, wherein the initiator is selected from the group consisting of peroxides, hydroperoxides, AIBN (azobis iso-butyronitrile) and benzoyl peroxide.

3. The process as claimed in claim 1, wherein the stiffening agent is selected from the group of acrylonitrile, vinylidene fluoride hexafluropropylene, vinyl alcohol, vinylacetate, methylmethacrylate and their co-monomers.

4. The process as claimed in claim 1, wherein in step c the polymerizable material is optionally pre-polymerized to obtain oligomers followed by in situ polymerization of the said oligomer and the ionic liquid as obtained in step (b).

5. The process as claimed in claim 1, wherein the polymerizable material is pre-polymerized to obtain oligomers followed by polymerization of the oligomers with the ionic liquid, either alone or with an aprotic organic solvent preferably propylene carbonate taken in a ratio of 9:1 to 8:2 in ionic liquid, in the presence of an initiator in the range of 0.5-1.0 Wt% of monomer or oligomer and cross linker in the range of 1-2 Wt % of monomer used, at a temperature of 60-70° C. for 20-40 minutes to obtain the desired polymer electrolyte, wherein the polymerizable material is a vinyl monomer.

6. A process as claimed in claim 5, wherein the monomer used is a vinyl monomer in the range of 20-25% by volume of the polymerizing solvent.

7. A process as claimed in claim 5, wherein the vinyl monomer used is methylmethacrylate (MMA).

8. A process as claimed in claim 1, wherein the conductivity of ionic liquid obtained is approximately $10^{-3}$ S/cm.

9. A process as claimed in claim 1, wherein the electrochemical stability of ionic liquid obtained in step (b) is in the range of −3 to +3 Volt.

10. A process as claimed in claim 1, wherein the polymer electrolyte obtained is in the form of transparent, highly ion conducting and thermally stable solid product.

11. A cross-linked polymer electrolyte obtained by the method of claim 1, wherein cross-links are formed by addition of acrylamide.

* * * * *